Patented July 31, 1945

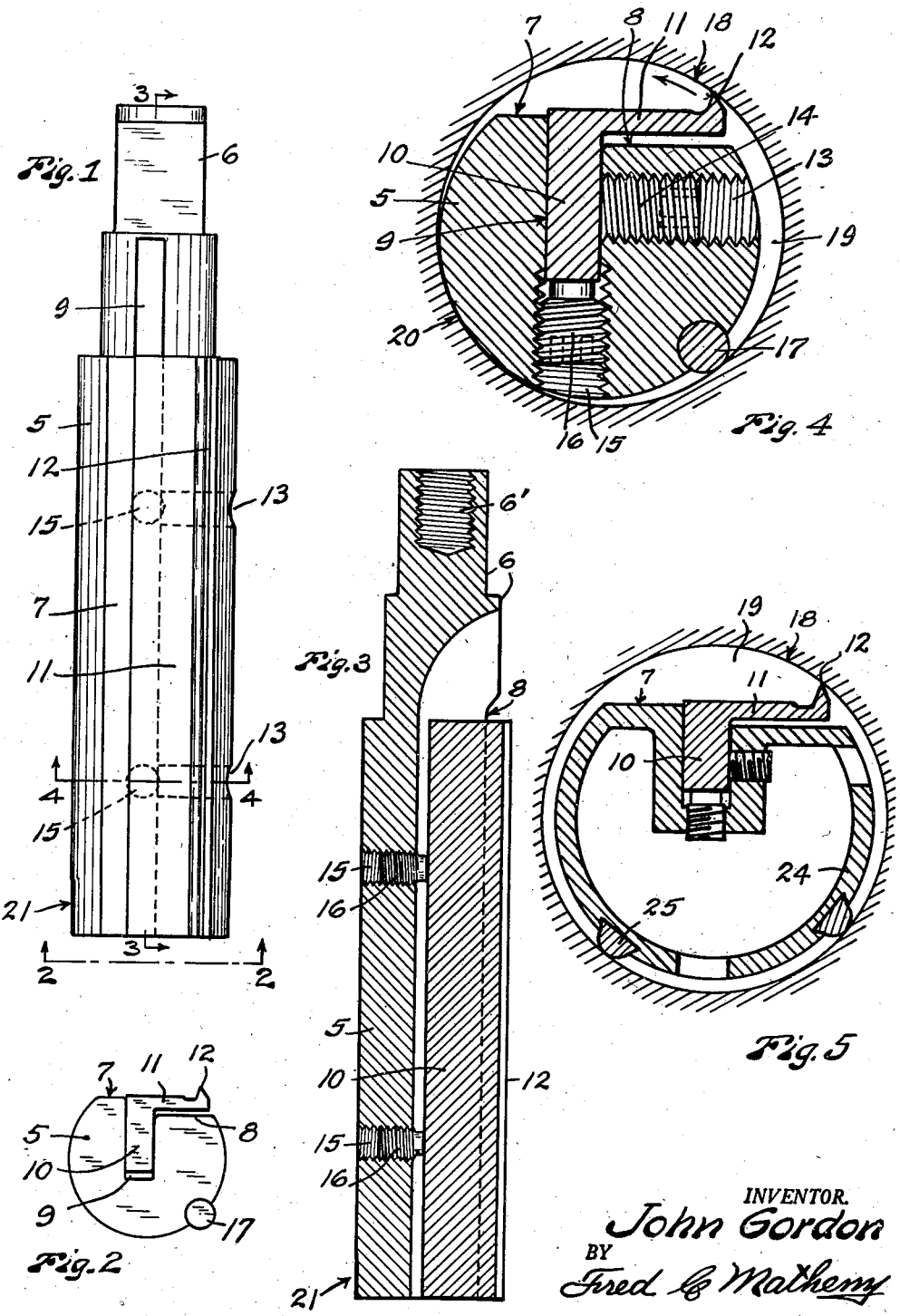

2,380,517

UNITED STATES PATENT OFFICE 2,380,517

SPRING BLADE REAMER

John Gordon, Seattle, Wash.

Application October 22, 1943, Serial No. 507,341

6 Claims. (Cl. 77—75)

My invention relates to a spring blade reamer for use in reaming holes in metal.

An object of my invention is to provide a reamer that will ream a hole to a true cylindrical shape from end to end of the hole and that will impart a smooth and accurate finish to the walls of the reamed hole.

Another object is to provide a reamer having a blade that is possessed of enough resiliency to prevent chatter of the blade when the reamer is in use thereby making it possible to ream a very smooth hole.

Another object is to provide a reamer having an adjustable blade so that holes of different sizes may be reamed with the same reamer and blade and so that a hole may be reamed to an exact size and a smooth finish imparted to the walls thereof by taking a plurality of thin cuts and adjusting the blade between successive cuts.

Another object is to save steel, labor and expense by providing an adjustable-blade reamer that can be used for reaming a plurality of holes of different diameters, as contrasted to ordinary machine shop practice which calls for a separate reamer for each different sized hole to be reamed.

Another object is to provide a spring tooth reamer that will not be affected by inaccuracies in a hole that is to be reamed but that will true up an inaccurately drilled hole and ream the same to a true and accurate cylindrical shape.

In reaming holes it is common practice to use a fluted reamer in which the flutes, to a certain extent, act as guides. As the cutting end portion of a fluted reamer follows the hole to be reamed, which hole will usually not be straight and true, the flutes will scrape against the sides of the reamed portion of the hole and will enlarge, to a certain extent, the portion of the hole into which they enter but these flutes will not have an opportunity to enlarge the last reamed end portion of the hole as the reamer will be withdrawn as soon as the cutting end portion has finished its cut. This kind of reaming results in an inaccurate or tapered hole, the last reamed end portion being finished substantially to_reamer size and the first reamed end portion being enlarged by the flutes. My reamer overcomes this difficulty by doing away with the flutes and providing instead a longitudinally extending spring blade cutter and adequate bearing means to support said cutter without enlarging one portion of the hole more than other portions.

Other objects of this invention will be apparent from the following description taken in connection with the accompanying drawing.

In the drawing

Figure 1 is an elevation of a spring blade reamer constructed in accordance with my invention.

Fig. 2 is an end view of the same looking in the direction of broken line 2—2 of Fig. 1.

Fig. 3 is a longitudinal sectional view of said reamer taken substantially on broken line 3—3 of Fig. 1.

Fig. 4 is an enlarged cross sectional view taken substantially on broken line 4—4 of Fig. 1.

Fig. 5 is a cross sectional view of a modified form of spring blade reamer.

Figs. 1 to 4 show a relatively long reamer body 5 of generally cylindrical shape in cross section. The body 5 is provided at one end with a shank 6 which is preferably of square cross section externally and has a threaded axial bore 6'. Any suitable reamer rotating means, either manually operated or power operated may be attached to the shank when the reamer is in use.

The reamer body 5 is flattened on one side to provide two flat surfaces 7 and 8 at different radial distances from the center of the body 5. The reamer body 5 is further provided with a longitudinally extending slot 9. The slot 9 is positioned to one side of the center of the reamer body, as shown in Figs. 2 and 4 and extends into the reamer body in a plane at substantially right angles to the planes of the flat surfaces 7 and 8.

The slot 9 is adapted for the reception of one flange 10 of a reamer blade. The reamer blade is of L shape in cross section. The other flange 11 of the reamer blade is of thin enough cross section so that it has enough resiliency to prevent chatter and vibration of the reamer when in use and said flange 11 terminates in a cutting blade 12 of a cross sectional shape best shown in Fig. 4. The blade 12 protrudes beyond the circumference of the reamer body. The reamer is adapted for use in a hole substantially larger in diameter than the reamer body.

The reamer body 5 is provided with one set of threaded holes 13 for the reception of locking screws 14 that engage with the flat side of the blade flange 10 and hold the blade against movement in the body member 5. Said reamer body is also provided with another set of threaded holes 15 for the reception of blade adjusting screws 16 that engage with the rear edge portions of said blade flange 10.

The reamer body 5 is also provided with a longitudinally extending bearing member 17, preferably in the form of an insert of cylindrical cross section. The bearing insert 17 protrudes outwardly from the circumference of the reamer body 5 and is adapted to engage with and bear against the wall 18 of a hole 19 that is being reamed. Preferably the bearing member 17 is positioned about ninety degrees from the cutting edge 12 of the blade and behind the cutting edge of the blade as respects the direction of rotation of the blade in operation.

The reamer body is substantially smaller than the hole that is being reamed, as best shown in Fig. 4, and when the reamer is in use the reamer body 5 bears against and engages with the wall 18 of the hole 19 along a line 20 that is approximately diametrically opposite to the cutting edge 12 of the blade and extends longitudinally of the reamer body.

The reamer body is supported within the hole 19 by engaging with the wall 18 along the line 20 and along the line of contact of bearing member 17. These two lines of contact support the reamer body against the pressure of the blade and insure that the cutting edge 12 will be correctly positioned for reaming at all times. When thus supported the cutting edge 12 will make a smooth clean cut and will ream a true cylindrical hole from end to end of said hole.

The leading or inner end portion 21 of the reamer body is preferably of slightly smaller size or diameter for a distance of approximately one half inch to facilitate starting the reamer into a hole. The end portion of the blade 12 is preferably ground off for about this same distance from its inner end.

The reamer shown in Fig. 5 is similar to the one just described except that the reamer of Fig. 5 has a tubular or hollow body 24 in the interest of lightness of weight and saving of material and said body 24 has an insert member 25 along the second bearing line or approximately diametrically opposite to the cutting edge of the blade.

In the operation of this reamer the spring blade is adjusted so that the cutting edge 12 thereof will follow a cutting circle slightly larger than the circle defined by the wall of the hole to be reamed. The smaller end portion 21 of the reamer is inserted in the hole to be reamed and the reamer is rotated, either manually or by power means, and is slowly fed into the hole. The bearing insert 17 and reamer body along the bearing line 20 will bear against the wall 18 of the hole 19 and hold the cutting edge 12 of the blade in cutting engagement with said wall 18. As the reamer body is rotated the cutting edge 12 will true up and ream the hole 17 until the hole, when measured, is found to be of the desired size. The resiliency of the flange member 11 prevents chatter of the reamer blade as the reamer body is rotated and this insures a smooth cut. Preferably a thin cut will be made at all times and the blade will be adjusted outwardly and the reaming operation repeated several times if the hole is to be substantially enlarged in the reaming process.

It has been found that, when a hole is reamed with my reamer as above described, initial inaccuracies in the hole will be eliminated and a smooth hole free from inaccuracies and of true cylindrical shape from end to end will be obtained.

In actual use applicant has reamed as many as eight successive holes of different diameters with the same reamer and blade. These holes were in steel approximately two and five eighths inches thick and the finished holes varied in diameter from 1.509 inches to 1.573 inches. All of these holes were true cylinders when finished and were smooth on the inside. In accordance with ordinary machine shop practice a separate reamer would have been required for each of these holes and the holes reamed by these separate reamers would not have been true cylinders when finished. Applicant reamed all of these holes with one reamer and blade and secured true and accurate and smoothly finished holes.

It has further been found that the same accurate results may be obtained with my reamer in the hands of a person who is not highly skilled in the art of reaming as may be obtained by one who is highly skilled.

I claim:

1. In a reamer a body member adapted for insertion into a hole that is to be reamed; a reamer blade of substantially L shape having a base flange rigidly secured to said body member and a resilient blade flange integral with the base flange, said resilient blade flange being provided along its outer portion with a straight cutting edge projecting sidewise therefrom and extending longitudinally of said body member; a bearing surface carried by said body member and extending longitudinally thereof at a location on the body member substantially diametrically opposite to said cutting edge; and another bearing surface carried by said body member and extending longitudinally thereof approximately mid way between said first named bearing surface and said cutting edge and to the rear of said cutting edge.

2. A reamer comprising a body member adapted for insertion into a hole to be reamed; a groove substantially radial extending longitudinally of said body member; a resilient reamer blade of substantially L shaped cross section having a base flange rigidly supported in said groove and having a resilient flange integral with the base flange, said resilient flange being provided along its outer edge with a cutting member projecting sidewise therefrom and extending longitudinally of said blade member throughout substantially its entire length; and two spaced apart bearing surfaces extending longitudinally of said body member at intervals of approximately ninety degrees to the rear of said reamer blade.

3. A reamer comprising a body member adapted for insertion into a hole to be reamed; a groove extending longitudinally of said body member; a reamer blade of substantially L shaped cross section having a base flange thereof positioned in said groove when the reamer and blade are in assembled relation and having a resilient blade flange integral with said base flange, said blade flange having a cutting edge extending throughout substantially its entire length and projecting sidewise therefrom; blade adjusting means operatively connected with said reamer blade; releasable means securing said reamer blade to said body member; and two spaced apart bearing surfaces provided on said body member and extending longitudinally thereof to the rear of said cutting edge.

4. A reamer comprising a body member adapted for insertion into a hole to be reamed; a groove extending longitudinally of said body member; a reamer blade of substantially L shaped cross section having two flanges one of which is positioned in said groove when said body member and reamer blade are in assembled relation, the other flange being slightly resilient and having a cutting edge provided on its marginal portion projecting sidewise from said resilient flange and extending lengthwise of said body member; releasable means securing said reamer blade to said body member; adjustable screw means engaging the rear edge of the flange that is positioned in said groove supporting said reamer blade for adjustment in said body member; and two spaced apart longitudinally extending bearing surfaces on said body member.

5. A reamer comprising a cylindrical body portion flattened on one side, a blade secured to said body member and having a resilient flange parallel to and spaced from the flattened side of said body portion, said blade having a cutting edge protruding sidewise from the marginal portion of said resilient flange and extending beyond the cylindrical wall of said body portion; and means providing two bearing surfaces extending longitudinally of said body portion throughout substantially its entire length and positioned at angular intervals of substantially ninety and one hundred eighty degrees respectively to the rear of said cutting edge, said bearing surfaces being adapted to bear against the walls of a hole that is being reamed.

6. A reamer comprising a body portion of generally cylindrical cross sectional shape flattened on one side; a longitudinally extending slot extending inwardly in a generally radial direction from the flattened side of said body portion; a reamer blade of L shaped cross section having a base flange secured in said slot and a resilient blade flange integral with said base flange and spaced clear of said body member; a cutting edge on said blade flange projecting beyond the cylindrical wall of said body portion; a longitudinally extending bearing insert in said body portion at an angular distance of substantially ninety degrees from said cutting edge and behind said cutting edge, said body portion being adapted to bear against the wall of the hole that is being reamed along a line substantially diametrically opposite to said cutting edge of said blade.

JOHN GORDON.